United States Patent Office 3,352,960
Patented Nov. 14, 1967

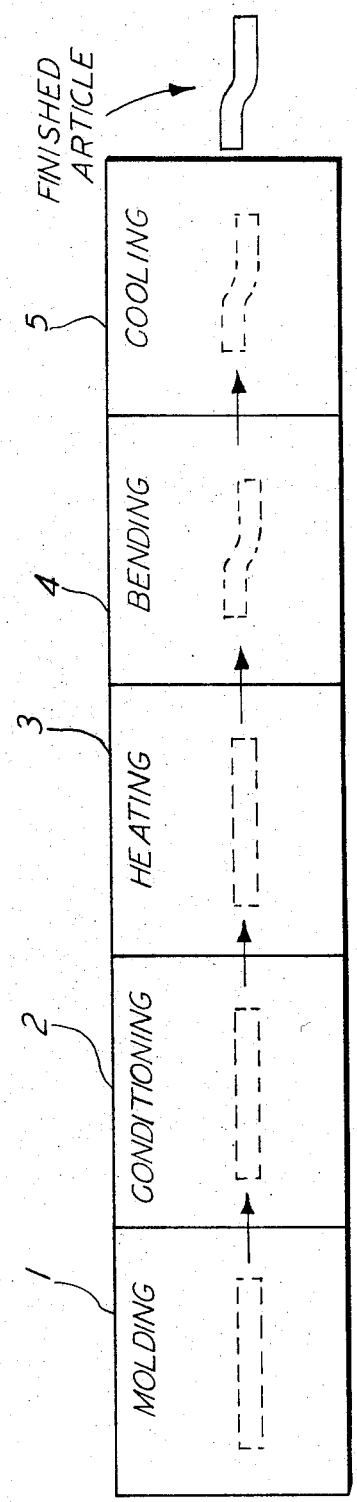

3,352,960
PLASTIC TUBE BENDING METHOD
Jack E. McLaughlin, Yuba City, Calif., assignor to Andermac, Inc., Yuba City, Calif., a corporation of California
Filed Aug. 18, 1965, Ser. No. 480,605
3 Claims. (Cl. 264—322)

ABSTRACT OF THE DISCLOSURE

Method of forming a bend or curve in a tubular piece of cured thermoplastic material. The piece is maintained in air having a predetermined relative humidity and a predetermined temperature until it is saturated with a moisture content relative to the material of the piece of approximately two percent by weight, with said moisture content the piece is heated to a temperature above its heat distortion temperature, at that temperature bent to the desired form, and thereafter permitted to cool.

---

The present invention relates generally to the manufacture of plastic articles and more particularly to a method for bending tubular pieces of cured thermoplastic material.

Plastics which may repeatedly be softened by heat and then hardened by cooling are termed thermoplastic materials. These materials undergo no chemical change on heating and are distinguished from thermosetting plastics which, when heated, undergo a chemical change and solidify or set so that they cannot be remelted. Products of thermoplastic materials are generally formed by either an injection molding or extrusion molding process with the greater portion of such products being formed by the injection molding process.

In the injection molding and extrusion molding processes a quantity of raw thermoplastic material in the form of granules or pellets is initially placed in a hopper forming a part of a plastic molding machine. In most cases the granules or pellets are completely dried immediately prior to the molding operation. This has been found to be necessary with most types of thermoplastic materials to promote uniform flow of the material during molding, to obtain a rapid molding cycle and to assure that the molded pieces are free of surface imperfections. If the raw material has been so dried the molded or cured product is likewise free of any moisture immediately after molding. In injection molding the raw material is heated to a softened flowable state and is then injected into a closed die or mold, following which the material is cooled in the die and ejected. In extrusion molding the softened material is forced through an orifice which forms a die. In each of these cases as well as in other plastic forming processes where a product is to have a hollow shape the forming or molding equipment includes a core element for forming the internal surfaces of the product, as for example, the mold or die core of an injection molder. The shape of the core member must be such that it may be withdrawn after the product has been molded. As a consequence tubular articles can be molded with such equipment only in straight or regularly curved forms.

The above-noted limitation of conventional molding equipment creates a need for a practical method by which tubular articles having irregular curves or severe bends may be formed. It is highly desirable that such method yield uniform products at a high rate of production, and to accomplish this, be adaptable to efficient mass production techniques. This is of extreme importance in the production of articles which are to be sold at low cost, such as disposable single use items.

Heretofore, it has been the practice to form irregularly curved tubular articles by molding separate halves and cementing the halves together. The articles produced by this method are frequently imperfectly formed with unsightly seam lines. The method has the further disadvantage of involving relatively slow and precise manipulative steps resulting in a costly operation.

A conventional method employed for forming the irregularly curved tubular articles in a single piece requires that they be initially molded in a straight form and then reheated to a softened state and bent individually by hand. The manual bending operation is a slow and painstaking one, and it is unreliable due to the frequent occurrence of warpage caused by internal stresses created when the dried material is reheated. Efforts to mechanize the bending operation have met with less than complete success because of the extreme susceptibility of the dried material to warp.

Virtually all thermoplastic materials in both the raw and cured state exhibit the ability to absorb moisture and absorb moisture of vapor present in a normal atmospheric environment. The amount of moisture present in cured thermoplastic material affects the properties of the material and more specifically substantially affects the performance of the material when it is softened and subjected to bending stresses. It has been found that for a particular thermoplastic material in the cured state optimum forming or bending characteristics are attained when the material has a specific predetermined moisture content. The moisture content is measurable in terms of percentage moisture content by weight.

By precisely controlling the moisture content of cured thermoplastic material, articles thereof may be conditioned to exhibit such optimum bending characteristics. With this conditioning the articles may be heated above the heat distortion temperature to a bending temperature and may be simply and reliably bent into irregular curves to yield the desired bent products without warped portions, seam lines and other defects which occur with conventional forming procedures. A practical method is thus afforded for bending the tubular articles into curved forms heretofore accomplished by slow, imperfect and costly methods.

It is, therefore, an object of the present invention to provide a new and improved method of forming bends and irregular curves in an article of cured thermoplastic material.

It is another object of this invention to provide a method for forming bends and irregular curves in an article of cured moisture absorbing thermoplastic material which utilizes such moisture absorbing quality to obtain optimum bending characteristics.

It is an additional object of this invention to provide a method for forming bends and irregular curves in a tubular article of thermoplastic material in which method the article is conditioned prior to the actual bending thereof, to obtain optimum bending characteristics.

It is yet another object of this invention to provide a method for forming bends and irregular curves in a tubular article of thermoplastic material which is molded as a single piece.

A still further object of this invention is to provide a method by which bends and irregular curves are formed in a tubular article of cured thermoplastic material uniformly and reliably which method may be performed mechanically and efficiently at a high rate of speed.

Other objects and advantages of this invention will become apparent from the description of one mode of performing the method of the invention taken in conjunction with the drawing, in which:

FIG. 1 is a schematic view of the method of the present invention.

In detail, the present method is performable as a supplement to conventional plastic molding processes to provide irregular curves and bends in a tubular article of cured thermoplastic material which article has been molded by such a conventional process. After the initial molding of the article (step 1, FIG. 1) the molded article is conditioned (step 2) to prepare it for the subsequent bending operation. The conditioned article is next heated above an initial heat distortion temperature (step 3) to a softened readily bendable state. Next, the article is bent while in the softened state (step 4), upon the application of bending stresses, and as a final step the article is cooled (step 5) whereby it is rehardened to set the desired shape.

All thermoplastic materials with the exception of a few of the vinyls are water absorbent to a slight degree in both the raw and cured state, with the susceptibility of the material to absorb water varying among the several materials. If the material is placed in an environment in which there is moisture present the material absorbs moisture until it reaches a point of saturation, and if the material is placed in an atmosphere which is dry relative to the moisture content of the material it loses moisture.

It has been found that it is desirable that raw molding materials be free of moisture immediately prior to molding in order to yield molded articles of best quality. In the case of the absorbent materials it is common to dry the granules or pellets prior to molding to rid the material of moisture absorbed from the atmosphere. The material of the molded articles is thus dry, but subsequently gains and loses moisture in a random and uncontrolled fashion. The rate at which a material absorbs or gains moisture is dependent on numerous factors, a significant one of which is the ratio of surface area to volume of the material in question. The greater the ratio the more rapid is the rate of absorption. For a specific thermoplastic material the point of saturation in terms of percentage moisture content by weight, varies with variation in temperature and relative humidity of the environment within which the material is located. Precise control of the moisture content of the material is thus accomplished by placing the material in an evironment having accurately regulated temperature and relative humidity, until the material reaches the point of saturation.

I have found that the moisture content of the material markedly affects its bending characteristics. More particularly, if moisture content is less than a predetermined desired percentage, the expansion which results when the material is heated creates internal stresses causing warpage and distortion. The temperature at which this occurs is lower than the temperature at which the material softens sufficiently for bending. If the material has a moisture content greater than the desired percentage it will be too soft upon reaching the bending temperature, and because of its softness, will pick up imperfections existing on the surface of the bending form and have poor surface finish. The softened material also experiences unintended deformation. If the moisture content deviates only slightly from the desired percentage an unrealiable bending operation results since the temperature at which the material can be bent without experiencing undesirable distortion or deformation too closely approximates the temperature at which such undesired effects occur.

To condition the material of the molded articles for bending the articles are placed in a chamber in which temperature and relative humidity are precisely regulated (step 2). The articles which are placed in the chamber have been molded in the conventional manner with the tubular portion of sufficient length to accommodate the desired bends and curves. As the articles are received from the mold the cured material is free of moisture, but if an amount of time has elapsed since molding, the material contains moisture in an indeterminate amount. The chamber is preferably of sufficient capacity to accommodate a large number of the articles to be bent which may all be saturated simultaneously. The articles are then simultaneously available for subsequent bending operations which may be performed at a high rate of speed on a mass production basis, to minimize cost. It is to be noted that once the articles have become saturated they may be kept indefinitely at the same temperature and relative humidity without affecting their moisture content.

When the articles have absorbed the desired amount of moisture they are ready to be heated to a pliant state for bending, and are removed from the conditioning chamber and placed in an oven (step 3). Care must be taken to assure that the desired moisture content is maintained after the articles are removed from the conditioning chamber since even a slight deviation is detrimental. It is preferable to maintain the temperature of the area in which the oven is located at the same temperature as the conditioning chamber so that the articles neither gain nor lose heat until they are placed in the oven. The conditioned articles in the oven are heated rapidly above an initial heat distortion temperature to a desired bending temperature. Upon reaching the desired bending temperature the articles are bent on a mechanical form (step 4). Once bent, they are cooled on the form (step 5) until they harden sufficiently to set in the desired shape, to complete the formation method.

The method is illustrated by the following example. In the example the articles to be bent are of pigmented cellulose acetate and have been formed to a tubular shape by a conventional injection molding process, with the tube having a ½-inch inside diameter and a $\frac{1}{16}$-inch wall thickness. The material is sold under the trademark Tenite Acetate 036 MH, by Eastman Chemical products, Inc. Bending the articles while in the dehydrated state is unfeasible because of warpage.

To condition the articles for bending they are placed in a conditioning chamber. For the articles described it is found that a percentage moisture content of 2% is the most desirable for permitting an optimum bending operation, and by testing with different combinations of temperature and relative humidity it is determined that the articles reach a saturation point with the desired moisture content when the chamber is maintained at a temperature of 80° F. and at a relative humidity of 60%. It requires approximately thirty hours for the articles to become saturated in this combination of temperature and relative humidity, but they may remain in the conditioning chamber for an indefinite period of time beyond the thirty hours with no change in moisture content.

After the articles are saturated they are removed from the conditioning chamber and placed in an oven for rapid heating to the bending temperature. For articles with a 2% moisture content the bending may be accomplished in the 190 to 200° F. range without warpage or objectionable deformation. The permissible range of variation in moisture content which will yield a desirable bending operation is extremely slight, ranging between 1.85% and 2.40%. If it were attempted to bend the articles in the dehydrated state warpage would occur at approximately 182° F. though bending could not be accomplished until a temperature of 190–195° F. was attained. Also, if it were attempted to bend the articles with a moisture content only slightly above 2.40%, the operation would be unreliable since bending would have to be accomplished within the restricted 195 to 200° F. temperature range to avoid objectionable warpage and deformation, and this range is too narrow to be reliably maintained.

When the articles have attained the desired bending temperature they are bent on a mechanical form (not shown). The articles are then cooled while secured to the form. In the cooling process the articles and form are subjected to room temperature wherein the articles harden sufficiently to set the desired shape within approximately one minute.

The method may be performed to bend articles at a high rate of speed by conditioning large groups of articles to be simultaneously prepared for the bending operation. Successive groups of conditioned articles may be made available according to the capacity of the bending equipment. From the conditioning chamber the articles may be placed on a feed device to be successively passed through an oven to attain the bending temperature. As the articles leave the oven at the desired temperature they may be bent on a continuously operating bending device. The bent articles remain in the forms until they are cooled to set the desired shape and are then conveyed to a station for subsequent operations such as storage, packaging, etc.

It is to be understood that the claims appended hereto are intended to cover all changes and modifications of the example of the invention herein chosen for purposes of disclosure which do not depart from the spirit and scope of the invention.

I claim:
1. The method of forming a bend in a tubular piece of cured, thermoplastic material of a type adapted to absorb moisture of vapor, that comprises the steps of:
   (a) positioning and maintaining said tubular piece in air having a constant predetermined relative humidity and a constant predetermined temperature substantially below the heat distortion temperature of said material until said material is saturated by aborption to a degree that is the equivalent of a moisture content relative to said material of said piece of approximately 2% by weight at 80° F.;
   (b) then and while said piece has said moisture content, heating said piece to a temperature above said heat distortion temperature and bending said piece to the desired form at said temperature thereabove; and
   (c) thereafter, permitting said piece to cool to atmospheric temperature.
2. The method of claim 1, in which:
   (d) said predetermined relative humidity is substantially 60% and said predetermined temperature is substantially 80° F.; and
   (e) said bending occurs within the temperature range of from approximately 185° F. to approximately 205° F.
3. The method of claim 2, with:
   (f) said material of said piece being cellulose acetate plastic.

References Cited
UNITED STATES PATENTS

| | | | |
|---|---|---|---|
| 607,415 | 7/1898 | Robinson | 264—339 |
| 1,880,053 | 9/1932 | Schur | 264—339 |
| 1,924,340 | 8/1933 | Whitehouse | 264—339 |
| 1,983,529 | 11/1934 | Brandenberger | 264—340 |
| 2,597,098 | 4/1949 | Hawtin | 264—343 |

OTHER REFERENCES

Plastics Engineering Handbook, Reinhold Publishing Co., New York, 1954, pages 116, 117, 129, 130, 132, 133, 151 to 154.

ROBERT F. WHITE, *Primary Examiner.*

R. KUCIA, *Assistant Examiner.*